Patented Dec. 5, 1950

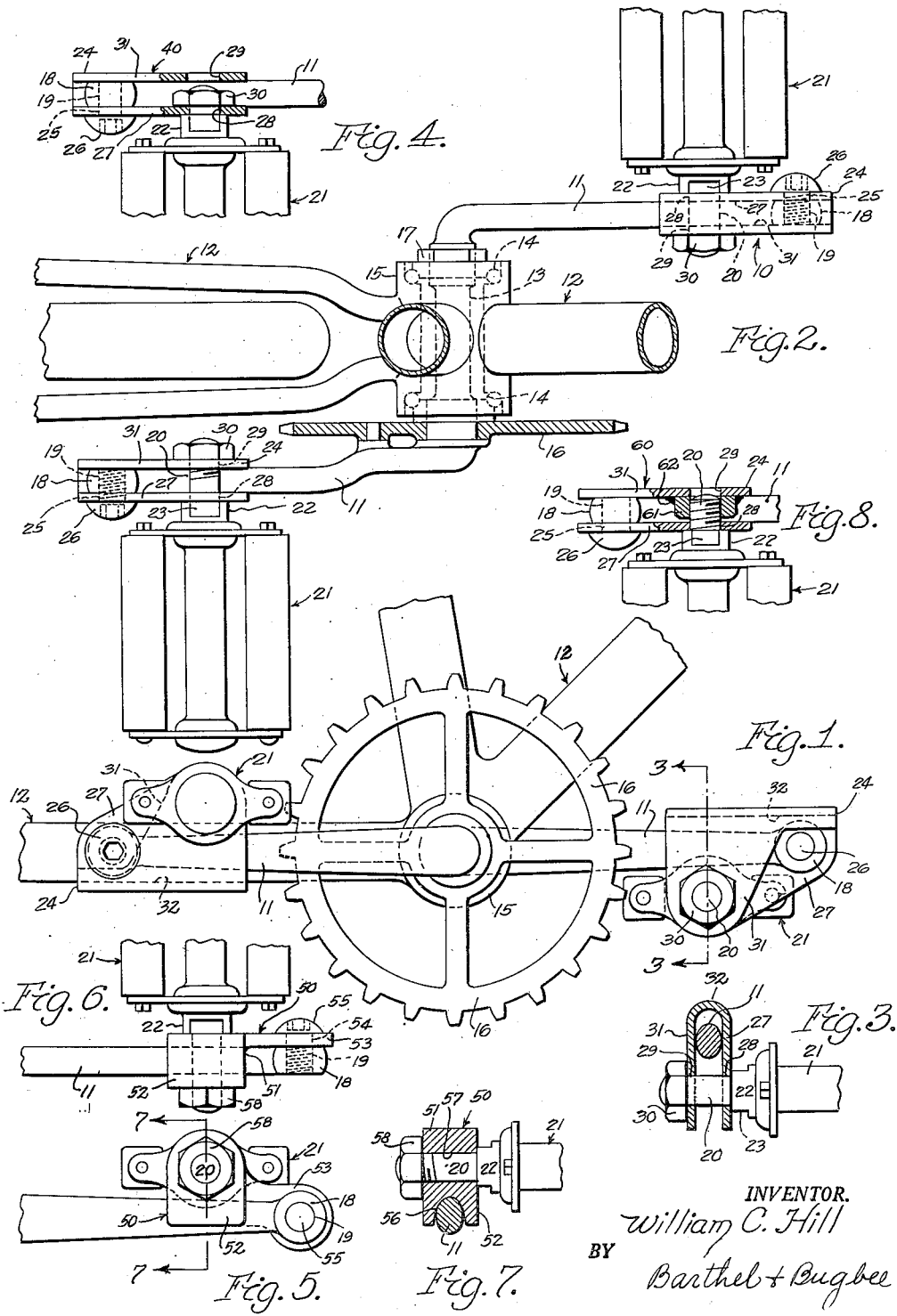

2,533,011

UNITED STATES PATENT OFFICE 2,533,011

BICYCLE PEDAL ADAPTER

William C. Hill, Detroit, Mich.

Application March 23, 1948, Serial No. 16,437

4 Claims. (Cl. 74—594.1)

This invention relates to bicycles, or similar vehicles, and in particular to crank mechanisms for such vehicles.

One object of this invention is to provide a bicycle crank shortening pedal adapter whereby the effective throw of the bicycle cranks may be shortened in order to adapt the bicycle for use by a child of younger age or shorter legs than could ordinarily use such a bicycle, thereby enabling a standard bicycle to be purchased for younger children than are ordinarily enabled to ride such a bicycle.

Another object is to provide a bicycle crank-shortening pedal adapter of the foregoing type wherein the adapter fits the threaded pedal axle bores in standard cranks, and has a second bore nearer the axis of rotation of each crank to which the pedal axle is shifted to shorten the crank throw.

Another object is to provide a bicycle crank-shortening pedal adapter of the foregoing type wherein no alterations whatever are necessary in the cranks or pedals of the bicycle, which fits any standard cranks and pedals, and which enables the adapter to be removed and the pedals shifted back to their original locations when the child's legs have grown long enough to reach the pedals in their standard locations.

In the drawings:

Figure 1 is a fragmentary side elevation of the cranks and crank hanger portion of a bicycle showing the pedals thereof attached to a bicycle crank-shortening pedal adapter according to a preferred form of the invention, for shortening the throw of the cranks;

Figure 2 is a top plan view, partly in horizontal section, of the portion of the bicycle shown in Figure 1;

Figure 3 is a vertical section taken along the line 3—3 in Figure 1;

Figure 4 is a fragmentary bottom plan view, partly in section, of a modification of the bicycle crank-shortening pedal adapter shown in Figures 1, 2 and 3;

Figure 5 is a fragmentary side elevation of a further modification of the bicycle crank-shortening pedal adapter of the invention;

Figure 6 is a fragmentary top plan view of the structure shown in Figure 5;

Figure 7 is a vertical section taken along the line 7—7 in Figure 5; and

Figure 8 is a fragmentary bottom plan view, partly in section, of a further modification of the bicycle crank-shortening pedal adapter of the invention.

Referring to the drawing in detail, Figures 1, 2 and 3 show a bicycle crank-shortening pedal adapter, generally designated 10 according to a preferred form of the invention as applied to the standard cranks 11 of a bicycle, generally designated 12. The cranks 11 are interconnected by the usual crank shaft 13 supported in antifriction bearings 14 in the crank hanger 15 of the frame 12. The usual sprocket 16 is mounted on one side of the crank hanger 15 and the remaining nut 17 on the other side thereof. Each of the cranks 11 is provided with the usual enlarged boss 18 with its standard threaded bore 19 which ordinarily receives the threaded axle 20 of a standard pedal 21. The axle 20, of course, has the usual enlargement 22 with the flat portions 23 for engagement by a wrench.

The bicycle crank-shortening pedal adapter 10 consists of a member 24 preferably made of heavy sheet metal and of approximately U-shaped cross-section embracing the opposite sides of the crank 11 and having a hole 25 through which a bolt or cap screw 26 is threaded through one of the side walls 27 into the threaded bore 19. The body member 24 is provided with a pair of aligned holes 28 and 29 which are located nearer the crankshaft 13 than the threaded bore 19, and through them is inserted the pedal axle 20 and clamped in position by a nut 30. The nut 30 is tightened so that the side walls 27 and 31 of the body member 24 are clamped firmly against the sides of the crank 11, which is held between the connecting portion or back 32 (Figure 3) of the body member 24 and the pedal axle 20 on the opposite side thereof.

In this manner, the throw of the cranks 11 is shortened so that a child with shorter legs than an adult can reach the pedals of the standard bicycle 12. When the child's legs grow longer, however, the adapters 10 can be removed by removing the bolts 26 and nuts 30 and reinserting the pedal axles 20 in the threaded bores 19.

The modified bicycle crank-shortening pedal adapter 40 of Figure 4 is generally similar to that shown in Figures 1 to 3 inclusive and similar parts are similarly designated by reference numerals. In the Figure 4 modification, however, the nut 30 is threaded onto the end of the pedal axle 20 between the side walls 27 and 31. The hole 29 thus becomes a mere access opening for a screw driver to engage the slot (not shown) frequently found in the end of a standard pedal axle. The attachment and detachment of the modified pedal adapter 40 is similar to that of the pedal adapter 10 described above except that the nut 30 does not draw the two side walls 27 and 31 together in clamping engagement with the crank 11. The construction is therefore somewhat simpler but the body member 24 must be made of stronger material in order to avoid bending after continued use.

The further modified bicycle crank-shortening pedal adapter 50 shown in Figures 5, 6 and 7 is for the same purpose as the adapters 10 and 40 previously described but rather than being made of sheet metal, is made on a casting or forging. The cast or forge body member 51 consists of a block 52 having an arm 53 extending outward therefrom and provided with a hole 54 through which a bolt or cap screw 55 is inserted into the threaded bore 19 in the crank 11. The block 52 is provided with a longitudinal groove 56 shaped to embrace one side of the crank 11. A transverse bore 57 is drilled through the block 52 for the passage of the bicycle pedal axle 20, which is threaded as before and which on its outer end carries a retaining nut 58.

The application and use of the modified bicycle crank-shortening pedal adapter 50 is similar to that of the adapters 10 and 40 described above. The pedal axle 20 is unscrewed from its normal position in the threaded bore 19 and replaced by the cap screw 55 threaded through the arm hole 54 into the bore 19. The pedal axle 20 is then inserted through the bore 57 and secured in place by the nut 58, the bolt or screw 55 being tightened until the groove 56 snugly engages the crank 11. When the child has outgrown the shortened throw positions of the pedals, the adapters 50 are removed by removing the bolts 55, the pedals 21 are removed from the adapter by unscrewing the nuts 58, whereupon the pedal axles 20 are replaced in the threaded holes 19 for which they are normally intended. The bicycle 12 can then be operated in the usual way with the normal crank throw.

The still further modified bicycle crank-shortening pedal adapter 60 shown in Figure 8 is generally similar to that shown in Figures 1 to 4 inclusive and similar parts are similarly designated by reference numerals. In the Figure 8 modification, however, the nut 61 is welded as at 62 to the inner surface of the side wall 31 opposite the hole 28 and in line with the hole 29.

The attachment and detachment of the modified pedal adapter 60 is similar to that of the pedal adapters 40 and 10 previously described except that the threaded axle 20 of the pedal 21 is inserted through the hole 28 and threaded into the threaded bore of the nut 61 by applying a wrench to the flat portions 23. The construction shown in Figure 8 enables a standard pedal to be used without the necessity for a lengthened axle 20 as in Figures 1 to 3 inclusive yet at the same time a clamping action is obtained which draws the side walls 27 and 31 together into clamping engagement with the sides of the crank 11. The usual bolt or cap screw 26 is threaded through the hole 25 into the threaded bore 19 in the boss 18 on the end of the crank 11.

What I claim is:

1. A crank-shortening pedal adapter for a bicycle having pedals on pedal axles in bores in the ends of cranks attached to the opposite ends of a crankshaft, said adapter comprising a body of bent sheet material adapted to lie adjacent and partially encircle said bicycle crank, said body having a plurality of longitudinally-spaced transverse holes, and a fastener adapted to be threaded through one of said holes into one of said pedal axle bores, the other hole being disposed nearer said crankshaft than said first-mentioned hole and adapted to receive said pedal axle, said body being of approximately U-shaped cross-section with side walls extending substantially parallel to one another and adapted to engage the opposite sides of said crank.

2. A crank-shortening pedal adapter for a bicycle having pedals on pedal axles in bores in the ends of cranks attached to the opposite ends of a crankshaft, said adapter comprising a body of bent sheet material adapted to lie adjacent and partially encircle said bicycle crank, said body having a plurality of longitudinally-spaced transverse holes, a fastener adapted to be threaded through one of said holes into one of said pedal axle bores, the other hole being disposed nearer said crankshaft than said first-mentioned hole and adapted to receive said pedal axle, said body being of approximately U-shaped cross-section with side walls extending substantially parallel to one another and adapted to engage the opposite sides of said crank and said pedal axle being adapted to extend through said other hole in at least one of said side walls, and a holding member adapted to receive and secure said pedal axle to one of said side walls.

3. A crank-shortening pedal adapter for a bicycle having pedals on pedal axles in bores in the ends of cranks attached to the opposite ends of a crankshaft, said adapter comprising a body of bent sheet material adapted to lie adjacent and partially encircle said bicycle crank, said body having a plurality of longitudinally-spaced transverse holes, a fastener adapted to be threaded through one of said holes into one of said pedal axle bores, said body being of approximately U-shaped cross-section and having side walls extending substantially parallel to one another and adapted to engage the opposite sides of said crank and a connecting wall extending between said side walls, said side walls having aligned holes disposed nearer said crankshaft than said first-mentioned hole, and an internally-bored and threaded member secured to one of said side walls with its threaded bore in alignment with said aligned holes and adapted to receive the threaded portion of said pedal axle.

4. A crank-shortening pedal adapter for a bicycle having pedals on pedal axles in bores in the ends of cranks attached to the opposite ends of a crankshaft, said adapter comprising a body of bent sheet material adapted to lie adjacent and partially encircle said bicycle crank, said body having a plurality of longitudinally-spaced transverse holes, a fastener adapted to be threaded through one of said holes into one of said pedal axle bore, said body being of approximately U-shaped cross-section and having side walls extending substantially parallel to one another and adapted to engage the opposite sides of said crank and a connecting wall extending between said side walls, said side walls having aligned holes disposed nearer said crankshaft than said first-mentioned hole, and an internally-bored and threaded member secured to one of said side walls with its threaded bore in alignment with said aligned holes and adapted to receive the threaded portion of said pedal axle, said pedal axle being adapted to extend through said aligned holes in both of said side walls on the opposite side of said crank from said connecting wall.

WILLIAM C. HILL.

(References on following page)

REFERENCES CITED

The following references are of record in the file of this patent:

UNITED STATES PATENTS

| Number | Name | Date |
|---|---|---|
| 329,517 | Warwick | Nov. 3, 1885 |
| 558,463 | Bascom | Apr. 14, 1896 |
| 558,464 | Bascom | Apr. 14, 1896 |
| 579,732 | Adams | Mar. 30, 1897 |
| 597,911 | Morris | Jan. 25, 1898 |
| 628,173 | Young | July 4, 1899 |
| 1,207,952 | Lynch | Dec. 12, 1916 |
| 1,569,063 | Zolla | Jan. 12, 1926 |
| 2,403,122 | Reisert | July 2, 1946 |

FOREIGN PATENTS

| Number | Country | Date |
|---|---|---|
| 4,156 | Great Britain | 1885 |
| 10,387 | Great Britain | 1888 |
| 99,352 | Netherlands | Apr. 14, 1942 |